(12) United States Patent
Hayes et al.

(10) Patent No.: US 7,266,701 B2
(45) Date of Patent: Sep. 4, 2007

(54) SYSTEM AND METHOD FOR ENABLING A REMOTE CONTROL TO AUTOMATICALLY AND DYNAMICALLY SET-UP A V-CHIP

(75) Inventors: Patrick H. Hayes, Mission Viejo, CA (US); Elissa K. Bordner, Santa Ana, CA (US)

(73) Assignee: Universal Electronics, Inc., Cypress, CA (US)

( * ) Notice: Subject to any disclaimer, the term of this patent is extended or adjusted under 35 U.S.C. 154(b) by 901 days.

(21) Appl. No.: 09/948,081

(22) Filed: Sep. 6, 2001

(65) Prior Publication Data

US 2003/0046579 A1 Mar. 6, 2003

(51) Int. Cl.
*H04K 1/00* (2006.01)
(52) U.S. Cl. ......................................... 713/185; 726/20
(58) Field of Classification Search ................ 713/168, 713/184–185; 386/83; 725/52; 380/44, 380/47; 726/20
See application file for complete search history.

(56) References Cited

U.S. PATENT DOCUMENTS

| | | | |
|---|---|---|---|
| 4,554,584 A | 11/1985 | Elam et al. | |
| 4,959,810 A | 9/1990 | Darbee et al. | |
| 5,005,084 A | 4/1991 | Skinner | |
| 5,481,256 A | 1/1996 | Darbee et al. | |
| 5,614,906 A | 3/1997 | Hayes et al. | |
| 5,828,402 A | 10/1998 | Collings | |
| 5,898,397 A * | 4/1999 | Murray | 341/176 |
| 5,959,751 A | 9/1999 | Darbee et al. | |
| 6,014,092 A | 1/2000 | Darbee et al. | |
| 6,107,937 A | 8/2000 | Hamada | |
| 6,151,077 A * | 11/2000 | Vogel et al. | 348/553 |
| 6,177,931 B1 * | 1/2001 | Alexander et al. | 725/52 |
| 6,216,228 B1 | 4/2001 | Chapman et al. | |
| 6,286,141 B1 * | 9/2001 | Browne et al. | 725/39 |
| 6,564,005 B1 * | 5/2003 | Berstis | 386/83 |

FOREIGN PATENT DOCUMENTS

| | | |
|---|---|---|
| WO | WO 01/44905 A2 | 6/2001 |
| WO | WO 01/49034 A2 | 7/2001 |
| WO | WO 02/17627 | 2/2002 |

* cited by examiner

*Primary Examiner*—Kim Vu
*Assistant Examiner*—Paula Klimach
(74) *Attorney, Agent, or Firm*—Greenberg Traurig

(57) ABSTRACT

A system and method for enabling a remote control to automatically and dynamically set-up a V-chip in a consumer appliance. The remote control is configured with an ID code which ID code is transmittable to the consumer appliance. Within the consumer appliance is stored a plurality of V-chip parameter tables. The consumer appliance is responsive to the ID code transmittable by the remote control to select one of the plurality of V-chip parameter tables to be used by the V-chip to determine accessibility to programming.

12 Claims, 10 Drawing Sheets

REMOTE CONTROL HARDWARE BLOCK DIAGRAM

DATA FRAME

System Address:  4 bits
User ID:  2 bits
Command:  6 bits
Checksum:  4 bits

All fields: MSB transmitted first.

ENCODING SCHEME (Dibit, 2PPM+2PWM)

Subcarrier: 40 KHz (33% duty cycle)   Basic time interval (T): 600 μS

Header pulse
(AGC burst)

Data bits are encoded in pairs, as follows:

End of frame:

(inter-frame gap)

| | D | L | S | V | FV |
|---|---|---|---|---|---|
| TV-MA | N | N | N | N | N |
| TV-14 | N | N | N | N | Y |
| TV-PG | N | Y | N | Y | Y |
| TV-G | Y | Y | Y | Y | Y |
| TV-Y7 | Y | Y | Y | Y | Y |
| TV-Y | Y | Y | Y | Y | Y |

EXAMPLE V-CHIP
PARAMETER TABLES

FIG. 7

| User | Password |
|---|---|
| 1 | 1111 |
| 2 | 2222 |
| 3 | 3333 |
| 4 | 4444 |

Example User Password
Table (showing start-up default values)

FIG. 8

SYSTEM AND METHOD FOR ENABLING A REMOTE CONTROL TO AUTOMATICALLY AND DYNAMICALLY SET-UP A V-CHIP

BACKGROUND OF THE INVENTION

The present invention relates generally to home entertainment and, more particularly, to a system and method for enabling a remote control to automatically and dynamically set-up a V-chip in a consumer appliance.

As described in U.S. Pat. No. 6,216,228 to Chapman et al., the US Telecommunications Act of 1996 set forth initiatives for enabling parental control over what is presented via television screens—effectively requiring inclusion of a viewing controller computer chip or "V-chip" within new consumer appliances. The V-chip functions to block presentation of certain content on the basis of a rating system. The ratings that the FCC has defined are:

TV-Y—zero violence or sexual content—all children can watch;
TV-Y7—for children 7 and over;
TV-G—for general audiences—no sex, violence or inappropriate language;
TV-PG—Parental guidance suggested;
TV-14—Suitable only for persons over 14—some sex or violence; and
TV-MA—Suitable only for mature audiences—may contain graphic violence or sexual situations.

The industry also agreed to apply the ratings to various categories of content that appear in programs. Thus, the letters "V," "S," "L," and "D" were added to indicate the presence of violence, sex, language, and suggestive dialogue, respectively. The letters "FV" (indicating "fantasy violence") were added to the children's ratings to indicate the presence of "more intense" violence in children's programs. These TV Parental Guidelines went into effect in October of 1997.

Broadcasters and other providers of content in the U.S. have been encouraged to transmit or record content which includes this rating information for detection by the V-chip and consumer appliance manufacturers are required to implement the necessary electronics to respond to this information. When installed on a consumer appliance such as, for example, a television, video game console, or the like, the V-chip is intended to be manually set-up to prevent the display of certain types of content. For example, a parent can program the V-chip with a rating and the TV will block all shows having content above that rating. So if a parent programs in the TV-Y7 rating, the TV will let through shows rated at TV-Y and TV-Y7 but will block all other shows. Further information regarding the details of V-chip operation may be seen in U.S. Pat. Nos. 4,554,584 and 5,828,402, which are incorporated herein by reference in their entirety.

While this legislation has increased the attention given to censorship and television viewing controls, it has not resulted in any significant technological advances in the V-chip set-up process. For example, one particular problem experienced by families, especially families with younger children, is that once the V-chip is manually set-up to filter content having an identified rating, any adult wishing to experience content having a higher rating is required to enter a password to gain access to and unlock the V-chip parental control settings. To the frustration of adults, this process is time consuming and complex as it often requires stepping through multiple screens in a consumer appliance set-up menu to find, access and then set the parameters for the V-chip. To further compound the frustration, this time consuming and complex process must be repeated after viewing the content to again set-up the V-chip to prevent the child from having access to all types of content.

For use in interacting with consumer appliance set-up menus, it is known in the art to provide remote controls. It is further known to provide remote controls with protocol or encoding schemes which include a data field to identify which one of several users is currently transmitting commands to a consumer appliance. Examples of such protocols include SolutioNet's TWIRP, Philip's RC-MM, and Cable & Wireless' Two Way TV. Other protocols such as NEC, Kaseikyo, and Philips RC-5 may also be easily adapted for this purpose by simply assigning a new significance to one or more of the data bits transmitted. Still further, U.S. Pat. No. 5,005,084 to Skinner describes another protocol to support user identification. While these protocols or encoding schemes allow individual users to be identified to consumer appliances, they have not been advantageously used in connection with V-chip technology. Therefore, the failure to contemplate using protocols and encoding schemes to identify users to a V-chip has left the process of setting a V-chip the frustrating, repetitive, manual, menu-driven process described above.

SUMMARY OF THE INVENTION

To overcome these and other deficiencies in presently implemented home entertainment systems having V-chip technology, the present invention resides in a system and method for enabling a remote control device to automatically and dynamically set-up a V-chip. Generally, a remote control is configured with an ID code which ID code is transmittable to the consumer appliance. Within the consumer appliance is stored a plurality of V-chip parameter tables. The consumer appliance is responsive to the ID code transmittable by the remote control to select one of the plurality of V-chip parameter tables to be used by the V-chip to determine accessibility to programming.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which:

FIG. 7 illustrates exemplary V-chip parameter tables for use in the systems illustrated in FIGS. 1 and 2; and FIG. 8 illustrates an exemplary user password table for use in the systems illustrated in FIGS. 1 and 2.

DETAILED DESCRIPTION

Figure 1A:
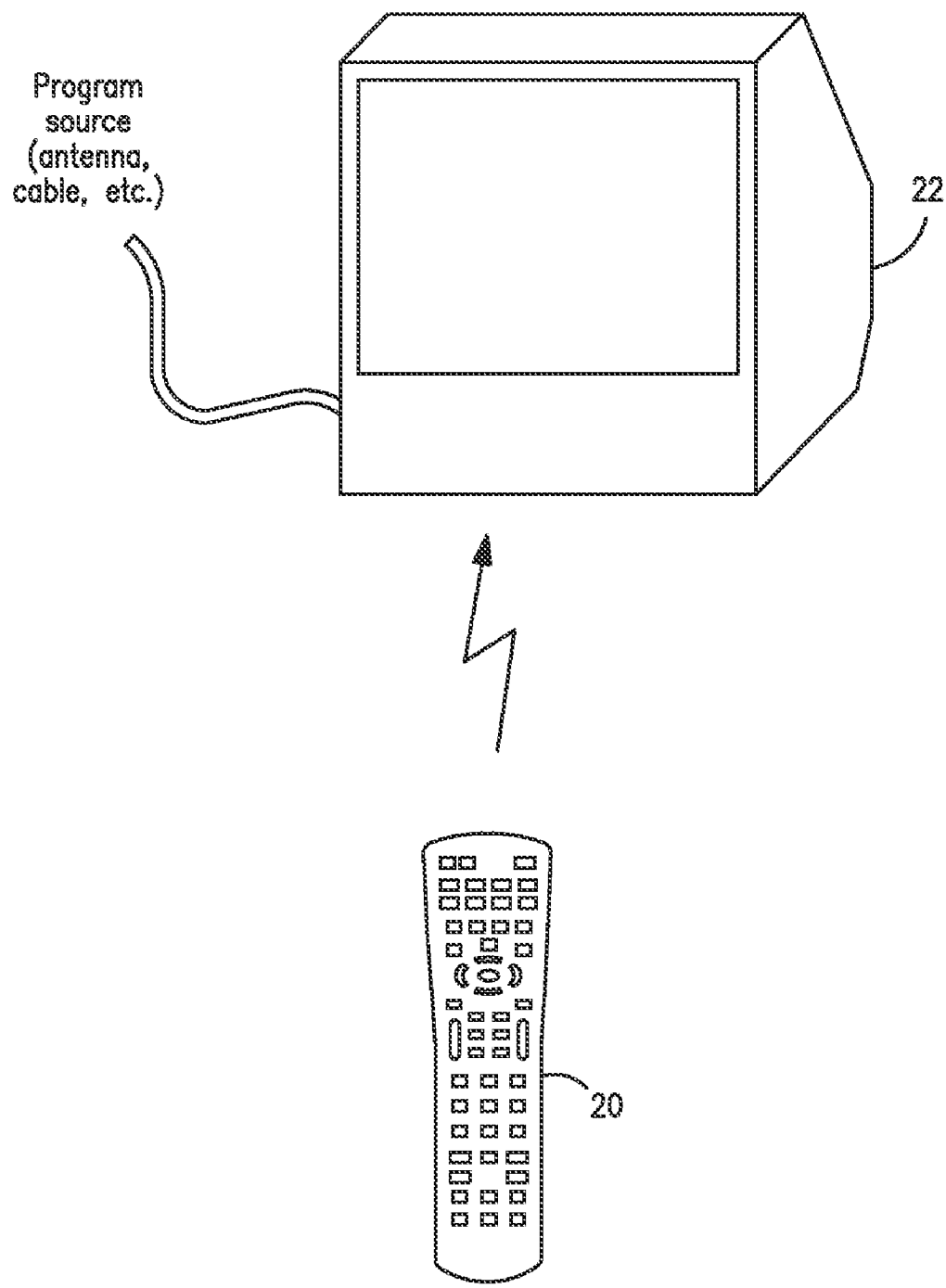
FIG. 1A illustrates an exemplary system comprising a single electronic appliance in which a remote control is enabled to automatically and dynamically set-up a V-chip in accordance with the principles of the subject invention.
Figure 1B:
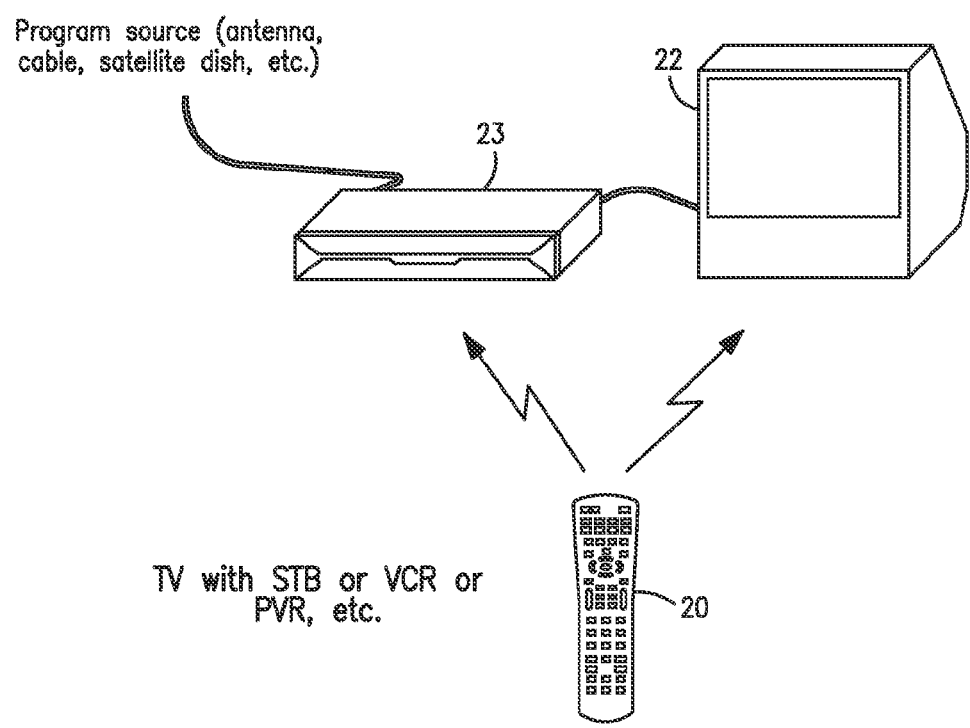
FIG. 1B illustrates a further exemplary system comprising multiple electronic appliances in which a remote control is enabled to automatically and dynamically set-up a V-chip in accordance with the principles of the subject invention.

Turning now to the figures, wherein like reference numerals refer to like elements, there is illustrated a system and method to automatically and dynamically set-up a V-chip in a consumer appliance to affect the display and/or transmission of media content. To this end, the system includes a hand-held controller, remote control, or the like, referred to hereinafter as a remote control 20, adapted to communicate with at least one consumer appliance 22 having a V-chip, such as the televisions illustrated in FIG. 1a and FIG. 1b. While illustrated as a television that is adapted to display media content, it will be appreciated that the method described hereinafter can be used in connection with any consumer appliance having a V-chip or V-chip-like capability such as, by way of example only, a VCR, a DVD player, a Personal Video Recorder ("PVR"), a cable signal receiver unit, a satellite communication receiver unit, video game unit, etc, to affect the display and/or transmission of media content. The remote control 20 may also be adapted to communicate with legacy consumer appliances that do not have a V-chip, such as set-top box 23 illustrated in FIG. 1b.

For communicating with the consumer appliances 22 and/or 23, the remote control 20 preferably includes a microprocessor 24 coupled to a ROM memory 26, a key matrix 28 in the form of physical buttons, a touch screen, or the like, an internal clock and timer 30, a transmission circuit 32, a non-volatile read/write memory 34, a visible LED 36 to provide visual feedback to the user of the remote control 20, and a power supply 38. As will be appreciated, the ROM memory 26 includes executable instructions that are intended to be executed by the microprocessor 24 to control the operation of the remote control 20. In this manner, the microprocessor 24 may be programmed to control the various electronic components within the remote control 20, e.g., to monitor power, to cause the transmission of signals, etc. Meanwhile, the non-volatile read/write memory 34, for example an EEPROM, battery-backed up RAM, "Smart Card," memory stick, or the like, is provided to store user entered setup data and parameters as necessary. While the memory 26 is illustrated and described as a ROM memory, memory 26 can be comprised of any type of computer-readable media, such as ROM, RAM, SRAM, FLASH, EEPROM, or the like. Preferably, the memory 26 is non-volatile or battery-backed such that data is not required to be reloaded after battery changes. In addition, the memories 26 and 34 may take the form of a chip, a hard disk, a magnetic disk, and/or an optical disk.

For commanding the operation of consumer appliances of different makes, models, and types, the memory 26 also includes a command code library. The command code library is comprised of a plurality of command codes that may be transmitted from the remote control 20 for the purpose of controlling the operation of a consumer appliance. The memory 26 also includes instructions which the microprocessor 24 uses in connection with the transmission circuit 32 to cause the command codes to be transmitted in a format recognized by an identified consumer appliance. While the transmission circuit 32 preferably utilizes infrared transmissions, it will be appreciated that other forms of wired or wireless, such as radio frequency, transmissions may also be used.

To identify consumer appliances by type and make (and sometimes model) such that the remote control 20 is adapted to transmit recognizable command codes in the format appropriate for such identified consumer appliances, data may be entered into the remote control 20. Since methods for setting up a remote control to control the operation of specific consumer appliances is well-known, it will not be described in greater detail herein. Nevertheless, for additional information pertaining to remote control setup, the reader may turn to U.S. Pat. Nos. 5,614,906 and 4,959,810 which are incorporated herein by reference in their entirety.

To cause the remote control 20 to perform an action, the remote control 20 is adapted to be responsive to events, such as a sensed user interaction with one or more keys on the key matrix 28. More specifically, in response to an event appropriate instructions within the memory 26 are executed. For example, when a command key is activated on the remote control 20, the remote control 20 may read the command code corresponding to the activated command key from memory 26 and transmit the command code to a consumer appliance in a format recognizable by the consumer appliance. It will be appreciated that the instructions within the memory 26 can be used not only to cause the transmission of command codes to consumer appliances but also to perform local operations. While not limiting, local operations that may be performed by the remote control 20 include favorite channel setup, macro button setup, command function key relocation, etc. Since examples of local operations can be found in U.S. Pat. Nos. 5,481,256, 5,959, 751, 6,014,092, which are incorporated herein by reference in their entirety, they will not be discussed in greater detail herein.

For use in identifying the remote control 20 to the consumer appliance 22, in particular, for use in automatically and dynamically setting up the V-chip as described in greater detail below, the remote control 20 is preferably adapted to transmit an ID code to the consumer appliance 22. To this end, data representative of the ID code may be transmitted to the consumer appliance 22 in connection with the transmission of command codes. By way of example, the data representative of the ID code can be included in a data frame that also includes data representative of the command code as illustrated in FIG. 3. By way of further example, the data frame may includes an ID data field comprised of 2 bits whereby up to four different ID codes can be represented. As illustrated in FIG. 3, the data frame may also include a command data field of 6 bits whereby up to 64 different command codes can be represented. It will be appreciated that both the ID data field and/or the command data field can be easily expanded as required and that many other protocols can be adapted to this application. Furthermore, while FIG. 3 illustrates an exemplary encoding scheme for the data frame, it will be appreciated that other encoding schemes can also be used.

Figure 2:
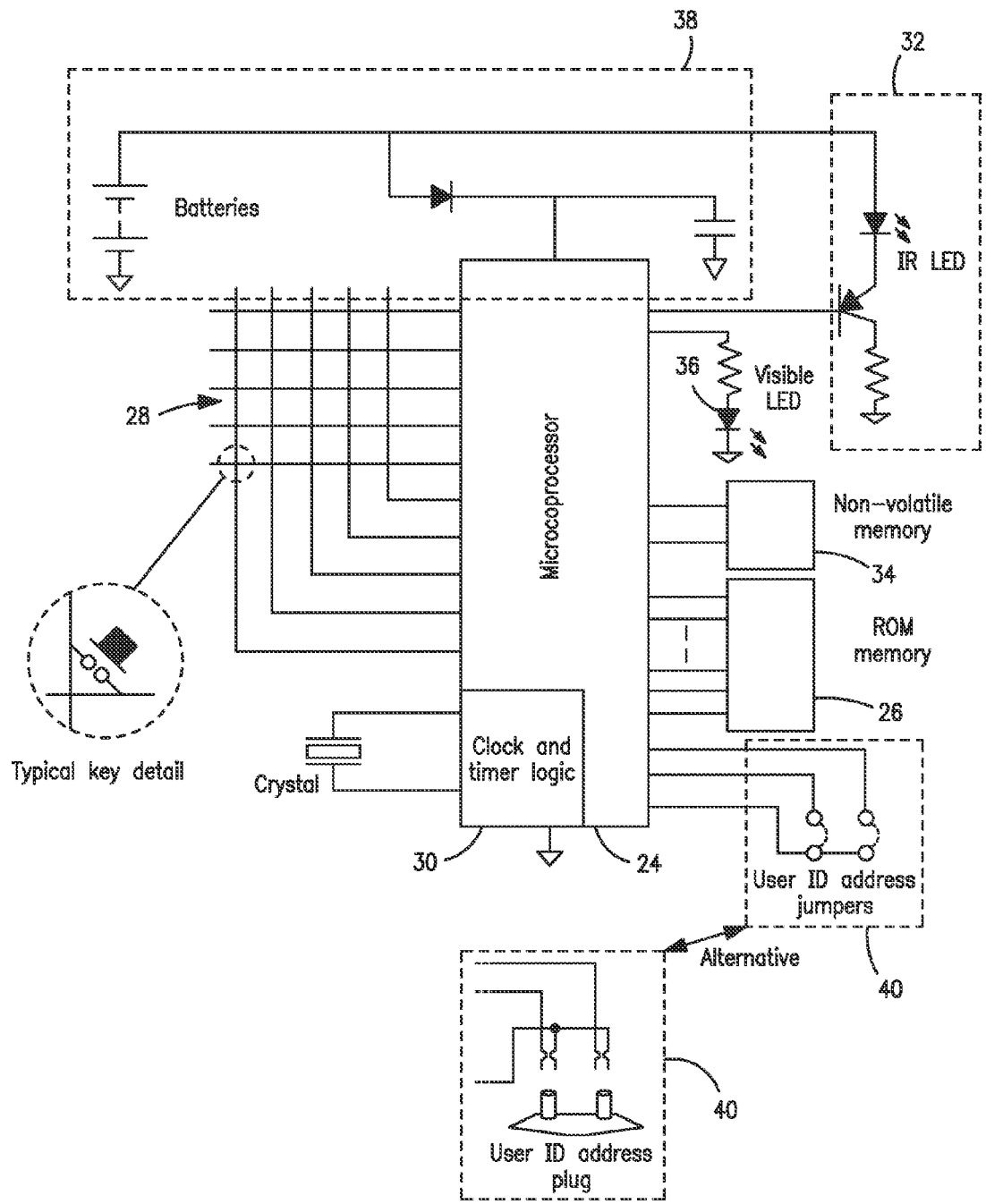
FIG. 2 is a block diagram illustrating exemplary components of the remote control illustrated in FIGS. 1 and 2.
Figure 3A:
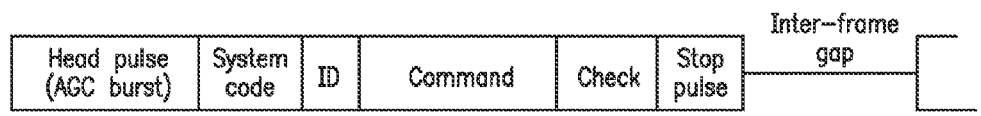
FIG. 3A illustrates an exemplary data frame for use in connection with the automatic and dynamic set-up of a V-chip in the systems illustrated in FIGS. 1 and 2.
Figure 3B:
FIG. 3B illustrates an exemplary encoding scheme for use in connection with the automatic and dynamic set-up of a V-chip in the systems illustrated in FIGS. 1 and 2.
Figure 3B:
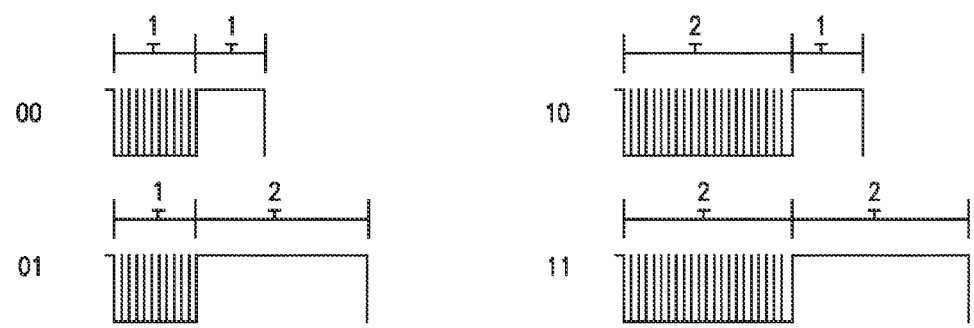
Figure 3B:
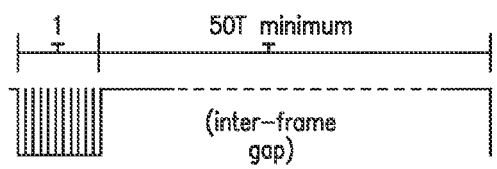

For configuring the remote control 20 to establish the ID code, which may then be represented by the data in the ID data field of a data frame, the remote control 20 may be provided with a physical address setting device 40 as illustrated in FIG. 2. In this regard, the physical address setting device 40 may consist of a jumpers to close an electrical circuit, which jumpers may be physically soldered into the device's printed circuit board or may comprise header blocks or wire-wrap connections arranged over pairs of protruding pins. The physical address setting device 40 can also comprise a dip switch. Still further, the physical address setting device 40 may consist of arrangements of plastic protuberances that function to separate electrical contacts to open or leave closed an electrical circuit. In this latter case, the plastic protuberances may be formed on a key card or the like which can be removably inserted into the remote control 20 to cooperate with the electrical contacts. In any case, it will be understood that the number of electrical circuits to be opened or closed preferably corresponds to the number of bits in the ID data field and that the state of each of the electrical circuits establishes the ID code for the remote control 20.

From the foregoing it will be appreciated that the ID code can be user settable, e.g., by allowing a user access to the jumpers, dip switches or the like within the remote control 20. Similarly, the ID code can be user settable by providing key cards or plastic inserts having differing arrangements of protuberances. Alternatively, the remote control can have a fixed ID code, i.e., it is established at the time of manufacture and the user is not provided with access to the physical address setting device used by the remote control 20. Still further, as described in greater detail below, the ID code could be stored in a location in memory as either a fixed or user settable code and need not be set using a physical address setting device. If the ID code is stored in memory, such storage preferably takes place in the non-volatile memory 34 so that the ID code is maintained across battery changes. It will also be appreciated that such non-volatile memory could be a releasable form such as a Smart Card or memory stick, to allow a user to move an ID code and other settings from one remote control 20 to another remote control 20.

Figure 4:
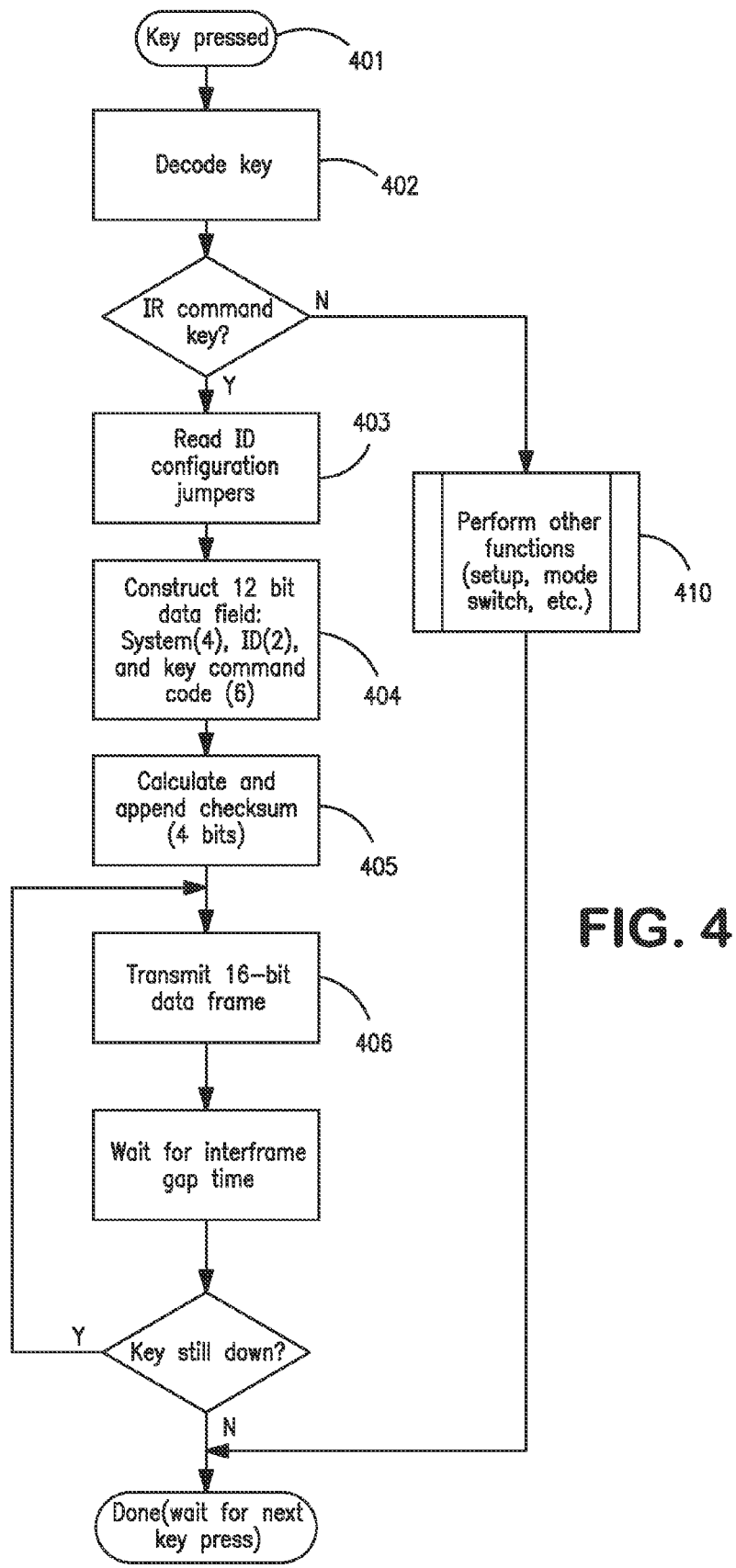
FIG. 4 is a flow chart diagram of an exemplary method of operating the remote control to affect the automatic and dynamic set-up of a V-chip in the systems illustrated in FIGS. 1 and 2.
Figure 5:
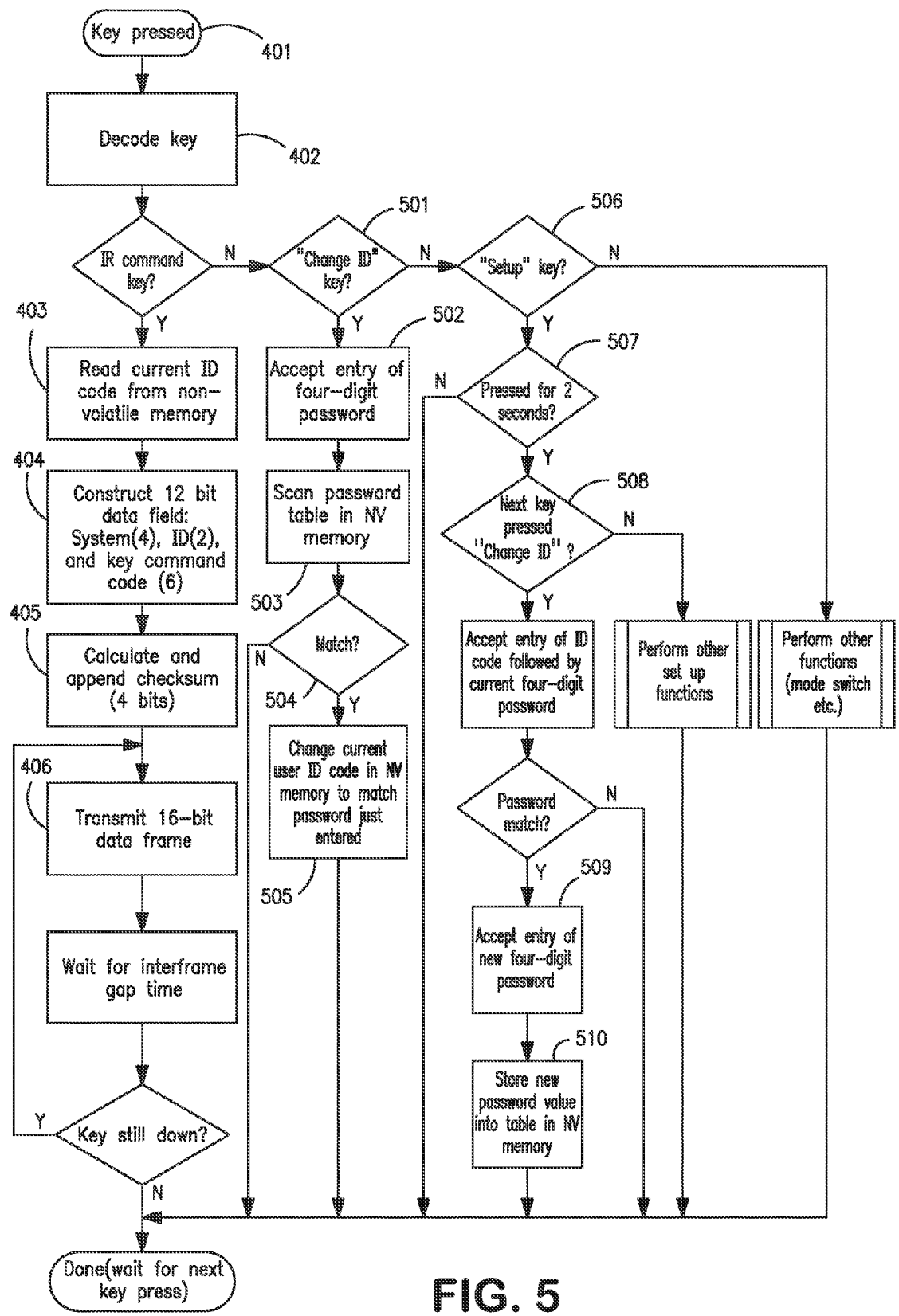
FIG. 5 is a flow chart diagram of an another exemplary method of operating the remote control to affect the automatic and dynamic set-up of a V-chip in the systems illustrated in FIGS. 1and 2.

To transmit data representative of the ID code to the consumer appliance 22, the remote control is adapted to be responsive to an event, such as the activation of a key on the key matrix 28. For example, as illustrated in FIGS. 4 and 5, upon activation of a key (401), the remote control can determine which key was activated (402) and, if the activated key corresponds to a command key (i.e., a key a user would press to transmit an operating command to a consumer appliance), the data frame which includes data representative of the ID code can be constructed (403-405) and transmitted (406) to the consumer appliance 22. More specifically, to construct the data frame, the physical address setting device 40 or a memory location in which the current ID code is stored is read to determine the bit pattern to include in the ID data field of the data frame. In addition, the command code corresponding to the activated keys or keys can be read from memory and included in the command data field of the data frame. The data frame may also include a data field containing data representative of a system ID and a data field which includes a calculated checksum.

If the activated key is not a command key (e.g., a set-up key, a mode key, etc.) the remote control 20 can perform a local operation (410). In this regard, as further illustrated in FIG. 5, if the remote control 20 supports a user settable ID code which is stored in memory, the local operation can be the setting of that user alterable ID code. By way of example, if the user activates a "change ID" key (501), which signifies a desire to change the ID code currently stored in memory, the user may be required to enter a password (502) before being allowed to change the ID code.

For use in changing the ID code each ID code can be assigned a unique password. In this case, a table located in non-volatile memory 34 might be used to store the mapping between each of the ID codes and the corresponding password as illustrated in FIG. 5. While not limiting, the password can be a four digit code which is entered by the user pressing corresponding number labeled keys on the key matrix 28. If the password entered after activation of the "Change ID" key matches a password in the table (503, 504), the remote control can be set so as to be automatically configured with the ID code that corresponds to the entered password (505). This ID code would then be stored in memory as the current ID code. Alternatively, a single password system can be used and, if the user correctly enters the password, the user can be further prompted to enter an ID code, e.g., a number from 1-4 when a two bit ID data field is being used. Again, this user entered ID code would be stored in memory as the current ID code.

The remote control 20 can be further adapted to allow the user to change passwords. By way of example, a desire to change the password can be indicated to the remote control 20 by the user activating a "set-up" key for a predetermined time period followed by activation of a "change ID" key (506-508). The user may then be required to enter an ID code followed by its current, corresponding password in the case where multiple passwords are mapped to multiple ID codes or for entry only of the current password in the case where a single password is used. If the correct password is entered, the user may then enter a new password value (508) which will then be maintained in memory (509).

Figure 6:
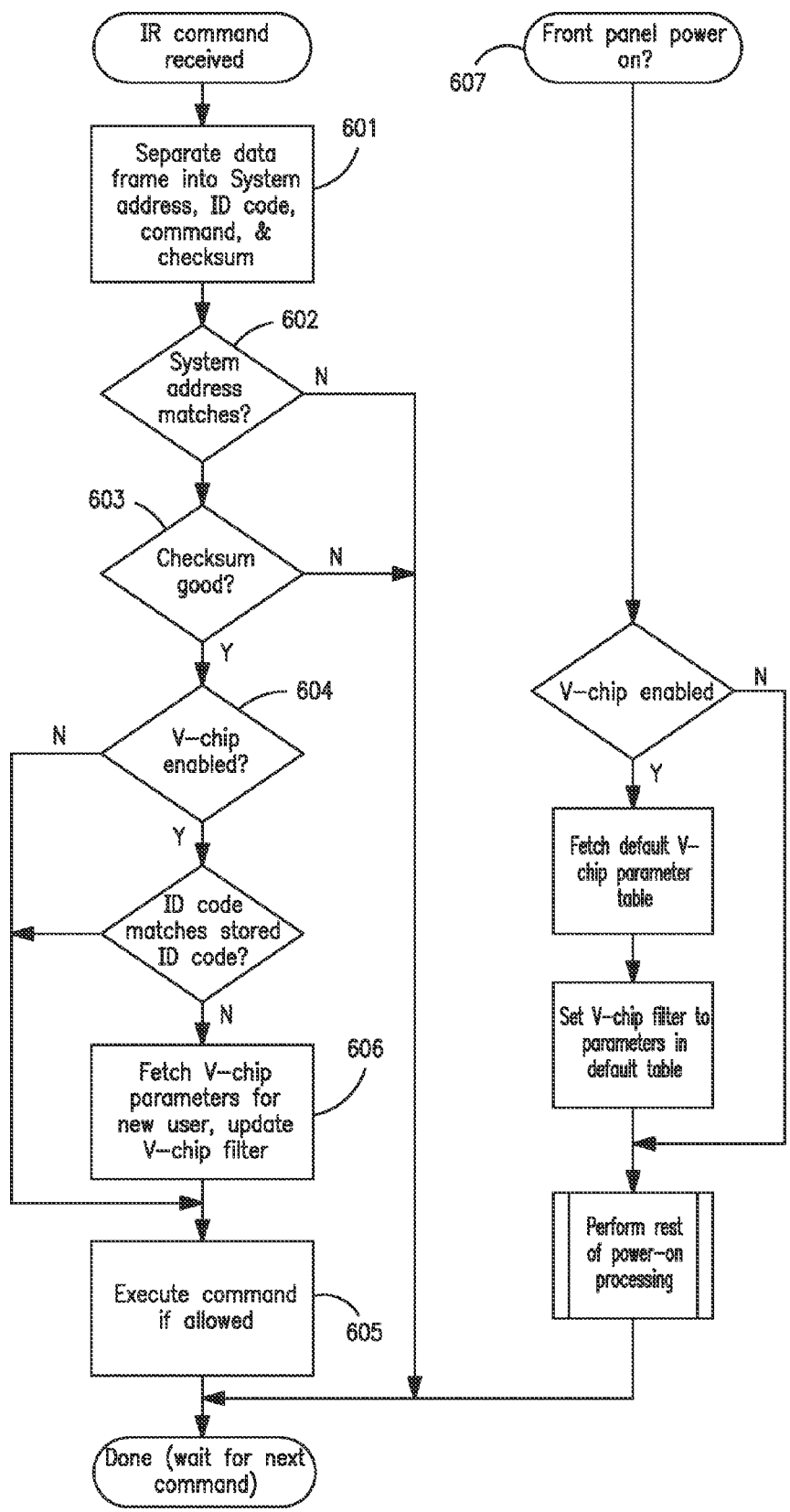
FIG. 6 is a flow chart diagram of an exemplary method of using a received transmission to affect the automatic and dynamic set-up of a V-chip in the systems illustrated in FIGS 1 and 2.

For use in the automatic and dynamic set-up of the V-chip within the consumer appliance 22, the consumer appliance preferably includes a plurality of V-chip parameter tables which are stored in the memory of the consumer appliance 22. The V-chip parameter tables are mapped to the ID codes that can be transmitted by the remote control 20. Preferably, each of the V-chip parameter tables is mapped to one of the ID codes that the one or more remote controls usable within the system can be configured to have. Within the V-chip parameter tables may be maintained data which functions to indicate whether or not content is to be filtered by the V-chip. For example, as illustrated in FIG. 6, the V-chip parameter table may include a value "Y" or "N" for each rating level and each category of content (such as violence, sex, language, suggestive dialogue, and/or fantasy violence) which values, when used by the V-chip, function to indicate to the V-chip whether programming having a given rating for a given category of content can be accessed ("Y") or cannot be accessed ("N").

To select which parameter table will be set-up to be used by the V-chip, i.e., the parameters in the V-chip parameter table will be used to determine whether or not programming can be accessed, the consumer appliance 22 is adapted to respond to the data representative of the ID code that is transmitted from the remote control 20. As noted previously, the ID code can be transmitted to the consumer appliance 22 by the remote control 20 in connection with the transmission of command codes. In this case, as illustrated in FIG. 6, the consumer appliance 22 separates the data frame to discern the system address, the ID code, the command code, and the checksum (601). The consumer appliance 22 then determines if the system address is correct (602), i.e., the transmission was intended for the consumer appliance 22, and that the checksum is correct (603), i.e., the transmission was not corrupted, before performing any further processing of the data contained with the data frame.

If the transmission was intended for the consumer appliance 22 and the checksum is correct, the consumer appliance 22 may next determine if its V-chip is enabled (604). If the V-chip is enabled, the ID code in the transmission is compared against the ID code currently stored within the memory of the consumer appliance 22. If the ID code in the transmission matches the ID code currently stored within the memory of the consumer appliance 22, the V-chip continues using the parameters within the V-chip parameter table corresponding to the stored ID code when determining whether or not programming is accessible. If the transmitted ID code does not correspond to the ID code currently stored in the consumer appliance 22, the transmitted ID code will replace the stored ID code as the current ID code within the consumer appliance 22 and the parameters within the V-chip parameter table (606) corresponding to that newly stored ID code will now be used to determine if programming can be accessed.

By way of example, assume a parent is using a parent's remote control that is configured to transmit data representative of an ID code "4" and that, within the consumer appliance, the ID code "4" is mapped to a V-chip parameter table that has parameters that allow all content to be viewed. So long as data frames including data representative of the ID code "4" are received at the consumer appliance, i.e., the transmissions are received from the parent's remote control, the V-chip will be set-up to allow all programming to be accessed. Now assume a child uses a designated children's remote control that has an ID code set to "1" and that, within the consumer appliance, the ID code "1" is mapped to a V-chip parameter table that has parameters that restrict the accessing of certain content. When the child uses the children's remote control to transmit command codes to the consumer appliance, such as "power" and "tune to channel 99," data representative of the ID code "1" will be transmitted to the consumer appliance 22, the consumer appliance 22 will now use the ID code "1" as its current ID code and the V-chip will be set to use the parameters from the V-chip table mapped to ID code "1" to determine if programming is accessible. In this case, if the content of the programming on channel 99 has ratings that the parameters within the V-chip parameter table indicate are to be filtered, the consumer appliance 22 will not perform the operation of tuning to channel 99 as was commanded.

To prevent a user from circumventing the system by interacting with the consumer appliance 22 directly, the consumer appliance 22 can be adapted to use the parameters from the most restrictive parameter table when the consumer appliance 22 is directly powered on. For example, if the user activates the "power" button on the consumer appliance 22, and if the V-chip is enabled, the ID code for the most restrictive V-chip parameter table will be stored as the current ID code within the consumer appliance and the V-chip parameter table mapped to this ID code will be set-up to be used by the V-chip. To this end, it is preferred that a given ID code, for example ID code "1," be provided with the most restrictive V-chip parameters and that this ID code be the default ID code stored by the consumer appliance when powered on in this manner. This most restrictive V-chip parameter table will continue to be used until a remote control 20 having an ID code corresponding to a less restrictive V-chip parameter table, e.g., ID codes 2-4, is used to interact with the consumer appliance 22. Since it is contemplated that the V-chip parameter tables may be user-settable to varying degrees of restrictiveness in conventional fashion, the user should be informed as to which of the V-chip parameter tables the system is configured to default to so as to allow the user to ensure that this V-chip parameter table continues to have its parameters set for the most sensitive viewer.

Once the ID code maintained within the consumer appliance 22 is set, by using a remote control or by interacting directly with the consumer appliance as described above, the V-chip in the consumer appliance will be set-up to continue to restrict programming in accordance with the V-chip parameter table corresponding to the ID code currently maintained by the consumer appliance. In this regard, the V-chip will function to restrict programming even if the programming is received via another consumer appliance. For example, if the V-chip within the television 22 is enabled and is set-up to use the parameters from a given V-chip parameter table, using the remote control 20 to change channels on the set-top box 23 of FIG. 1b will not function to circumvent the described system. Rather, the V-chip will still function to filter the content received from the set-top box 23.

From the foregoing description, it will be appreciated that the subject system can be used to provide individual users with their own remote controls which have a unique ID code which ID code is transmittable to the consumer appliance 22 for the purpose of identifying the user to the consumer appliance to automatically and dynamically set-up the V-chip. Alternatively, if a single remote control 20 is being used, each user can be provided with a unique ID code which ID code will again be transmitted to the consumer appliance 22 for the same purpose. To this end, if the ID code is being stored in the memory of the remote control 20, it is preferred that the memory be non-volatile to ensure that the ID cannot be reset to a start up value by simply removing the power source from the remote control 20.

While specific embodiments of the present invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A system for enabling set-up of a V-chip, comprising:
a remote control comprising a key matrix having a plurality of keys and a device on which is stored an ID code and programming which responds as each of the plurality of keys is activated to transmit a data frame to a consumer appliance which comprises a representation of the ID code read from the device and stored by the programming in a first data field of the data frame and the consumer appliance comprises a memory in which is stored a plurality of V-chip parameter tables for use by the V-chip to determine accessibility to media playable on the consumer appliance and programming for discerning the representation of the ID code in the first data field of the data frame when received from the remote control and for using the representation of the ID code to select one of the plurality of V-chip parameter tables to be used by the V-chip.

2. The system as recited in claim 1, where the ID code stored in the device is unique to the remote control when the remote control is used in system comprised of a plurality of remote controls capable of transmitting data frames to the consumer appliance.

3. The system as recited in claim 1, wherein the remote control comprises a memory in which is stored a plurality of command codes for commanding operations of the consumer appliance and the programming of the remote control responds as each of the plurality of keys is activated to read at least one of the plurality of command codes from the memory and store the at least one of the plurality of command codes in at least a second data field of the data frame.

4. The system as recited in claim 3, wherein the programming of the consumer appliance discerns the at least one command code in the at least one second data field of the data frame when received from the remote control and performs at least one operation indicated by the at least one command code only when allowed by the V-chip when the V-chip is using the one of the plurality of V-chip parameter tables selected using the representation of the ID code in the first data field of the data frame.

5. The system as recited in claim 1, wherein the device comprises a memory in which the ID code is stored.

6. The system as recited in claim 5, wherein the programming of the remote control provides for allowing a user to set the ID code that is stored in the memory.

7. The system as recited in claim 1, wherein the device comprises a physical address setting device by which the ID code is assigned to the remote control.

8. The system as recited in claim 7, further comprising a key card for use in connection with the physical address setting device to assign the ID code to the remote control.

9. The system as recited in claim 1, wherein the programming of the consumer appliance selects a predetermined one of the plurality of V-chip parameter tables to be used by the V-chip in response to the consumer appliance being manually turned on and continues to use the selected one of the plurality of V-chip parameter tables until at least such time as the consumer appliance receives the data frame having the ID code from the remote control.

10. The system as recited in claim 9, wherein the predetermined one of the plurality of V-chip parameter tables is a most restrictive one of the plurality of V-chip parameter tables.

11. The system as recited in claim 1, wherein the device of the remote control stores a plurality of ID codes of which one ID code is selected for inclusion in the first data field of the data frame.

12. The system as recited in claim 11, wherein the programming of the remote control accepts a password to select one ID code from the plurality of ID codes to include in the first data field of the data frame.

* * * * *